United States Patent

[11] 3,575,197

| [72] | Inventor | William A. Ray<br>North Hollywood, Calif. |
|---|---|---|
| [21] | Appl. No. | 837,286 |
| [22] | Filed | June 27, 1969 |
| [45] | Patented | Apr. 20, 1971 |
| [73] | Assignee | International Telephone and Telegraph Corporation<br>New York, N.Y. |

[54] VALVE LEAK DETECTOR
10 Claims, 6 Drawing Figs.

[52] U.S. Cl. ............................................ 137/312,
    137/557, 431/22
[51] Int. Cl. ..................................... F16k 25/00,
    F16k 37/00
[50] Field of Search ........................................ 137/312;
    137/557; 340/242; 73/46; 277/2; 431/22

[56] References Cited
UNITED STATES PATENTS

| 3,225,816 | 12/1965 | Familo | 431/22 |
|---|---|---|---|
| 1,826,941 | 10/1931 | LaMont | 137/312X |
| 3,050,077 | 8/1962 | Wheatley | 137/312 |
| 3,473,554 | 10/1969 | King | 137/312 |

Primary Examiner—M. Cary Nelson
Assistant Examiner—Richard Gerard
Attorneys—C. Cornell Remsen, Jr., Walter J. Baum, Paul W. Hemminger, Percy P. Lantzy and Thomas E. Kristofferson ABSTRACT: The invention includes, for example, a special main line gas shutoff valve for the main burner of a gas furnace. The valve has two seats. Means are then provided to detect gas leakage into the space between seats. Preferably, a pressure switch is actuated to prevent main burner ignition if a gas leak is detected.

INVENTOR
WILLIAM A. RAY
BY
ATTORNEY

INVENTOR
WILLIAM A. RAY
BY
ATTORNEY

INVENTOR
WILLIAM A. RAY
BY
ATTORNEY

VALVE LEAK DETECTOR

BACKGROUND OF THE INVENTION

This invention relates to fluid valves and, more particularly, to an arrangement for detecting leaks in valves.

Valve leaks for gas furnaces are hazardous because the ignition of the main burner surrounded by gas leaking from the main shutoff valve can cause the surrounding gas to explode. This problem is also accentuated in modern enclosed furnaces because the lack of adequate ventilation makes it difficult to exhaust gas leaking into the furnace.

In spite of the foregoing hazards, practical gas leak detectors have not been developed. One outstanding problem in detecting gas leaking through a main line shutoff valve is that the leaking gas in the valve outlet is at a pressure so low that practical detection is made impossible.

SUMMARY OF THE INVENTION

In accordance with the detector of the present invention, the above-described and other disadvantages of the prior art are overcome by providing a valve having two spaced seats. The space between seats is connected with the valve outlet by a passage. The passage is divided into first and second portions by a constriction. Thus, any fluid leakage past one seat causes the pressure in the first portion to rise above that in the second portion. The pressure in the first portion can thus be detected by the use of a practical, inexpensive, pressure switch. If desired, the pressure switch may be incorporated in the indicating arming, ignition, or "cold check" circuit for lighting the main burner. In case of leaking gas, ignition may thus be prevented by pressure switch actuation.

The above-described and other advantages of the invention will be better understood from the following description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENTS

Figure 1:
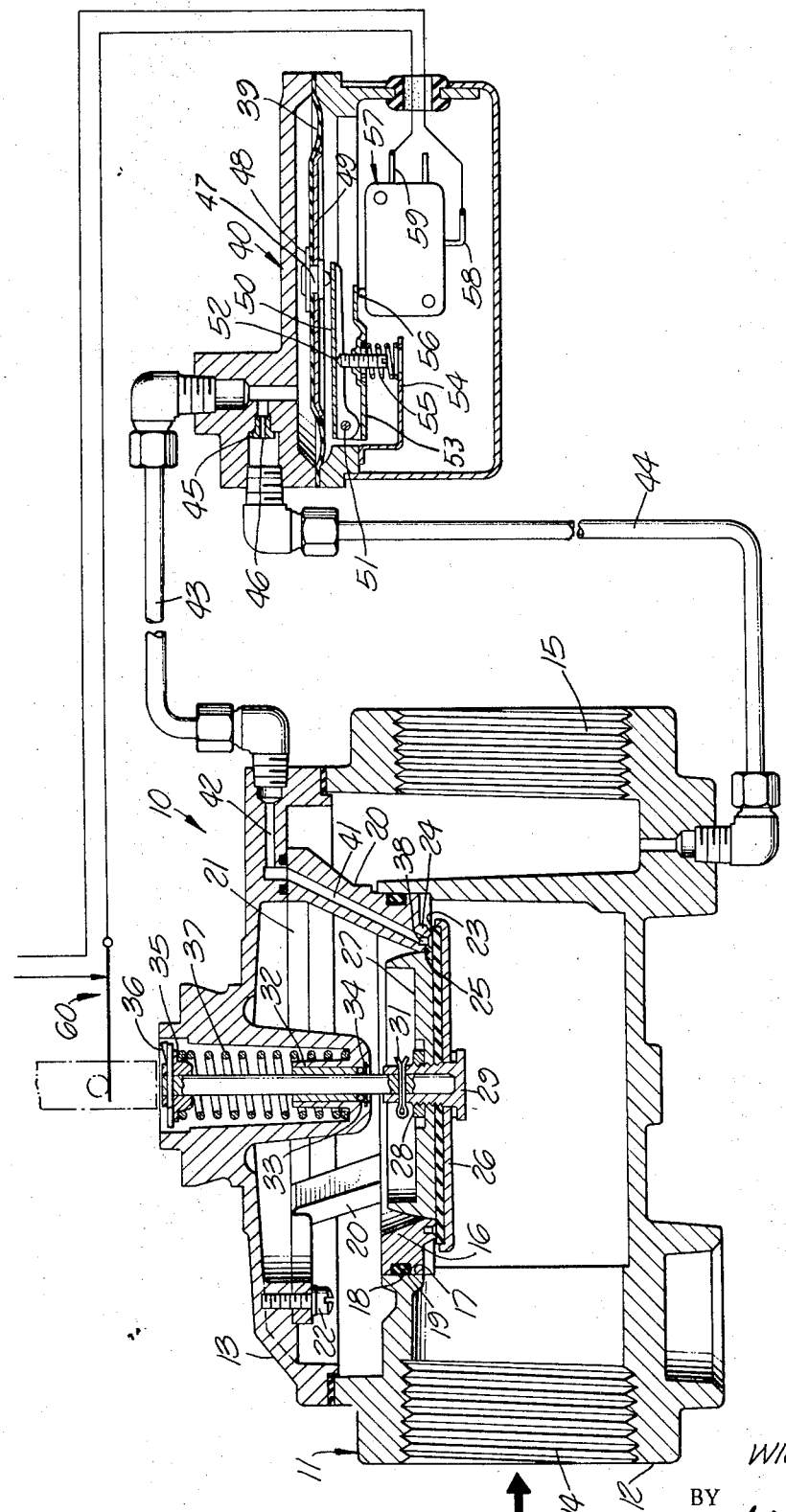
FIG. 1 is a sectional view of a detector constructed in accordance with one embodiment of the present invention.

In FIG. 1, a gas leak detector is indicated at 10, including a valve body 11. Body 11 has a lower portion 12 and an upper portion 13 fixed together by conventional means such as screws, not shown. Body 11 has an inlet 14 and an outlet 15.

Ring 16 is positioned in a bore 17 of valve body portion 12. Ring 16 has an external annular groove 18. An O-ring 19 is located in groove 18. Ring 16 is supported in body 11 by three projections 20 which are integral with a ring 21. Ring 21, in turn, is fixed to valve body portion 13 by screws 22.

A resilient valve 23 engages two concentric seats 24 and 25, and valve 23 is fixed between plates 26 and 27 by a nut 28 that is threaded to a cap 29. Cap 29 is fixed to a shaft 30 by a cotter key 31.

Shaft 30 slides through valve body portion 13 inside a bushing 32. An O-ring 33 is fixed between the end of bushing 32 and a snap ring 34. A follower 35 is fixed to the upper end of shaft 30 by a cotter key 36. Valve 23 is then biased normally closed by a helical spring positioned between valve body portion 13 and spring follower 35. Note will be taken that valve seats 24 and 25 are spaced radially from each other. Thus, when the valve is closed, a cavity is created in ring 16 between seats 24 and 25. Communication is then provided from this cavity as indicated at 38 to above a flexible diaphragm 39 shown in a body 40. Communication is provided through passages 41 and projections 20, passages 42 in valve body portion 13, and a conduit 43. Communication is also provided from the space between diaphragm 39 and body 40 to outlet 15 through a conduit 44. However, a plug 45 prevents gas flowing in conduit 43 from entering conduit 44 except at a substantially reduced pressure. Plug 45, thus, has a small orifice 46 therein; plug 45, thus, provides constriction in the path from cavity 38 to outlet 15.

In body 40, a pin 47 holds diaphragm 39 in a fixed position between a washer 48 and a plate 49. Pin 47 bears against an arm 50 pivoted at 51. Arm 50 bears against a screw 52 which is threaded through arm 53. Appendage 54 fixed to body 40 holds a spring 55 in forced engagement with arm 53. Arm 53 bears against the actuating member 56 of a switch 57. The common line of switch 57 indicated at 58 and the normally closed contact 59 are connected in series with a conventional "cold check" circuit. An auxiliary switch 60 is also connected in series with the "cold check" circuit. Switch 60 is open when valve 23 is open. Switch 60 closes at or near the seating position of valve 23.

In the operation of the detector 10 shown in FIG. 1, valve 23 closes; and the seats 24 and 25 provide a double seal between inlet 14 and outlet 15. If a leak develops at seat 24, gas leaking from inlet 14 is passed through conduit 43 into the space at body 40 and diaphragm 39. Diaphragm 39 will then move downwardly and actuate switch 57 to open normally closed contact 59. The "cold check" circuit will then indicate that the main burner of the gas furnace should not be fired. Note will be taken that the purpose of plug 45 is to raise the pressure above diaphragm 39 between it and body 40 so that even with a very small gas leak, positive actuation of switch 57 may be accomplished. Further, switch 57 may be relatively inexpensive. Preferably, plug 45 has a flow rate of the order of 1 to 5 cubic feet per hour at conventional gas pressures.

Figure 2:
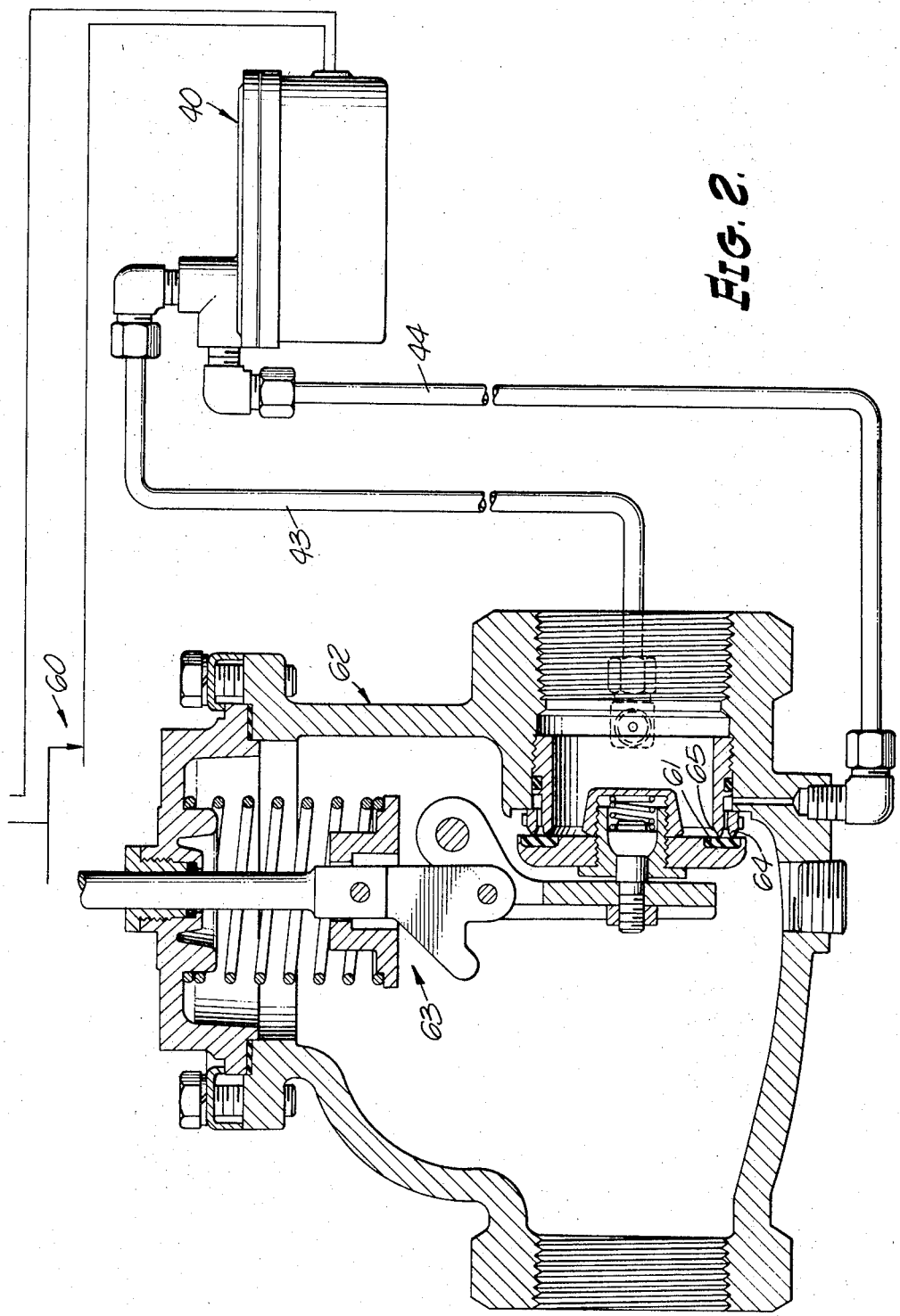
FIGS. 2, 3, 4, 5, and 6 are sectional views of alternative embodiments of the invention.

In FIG. 2, all of the structures connected with conduits 43 and 44 at the ends thereof adjacent body 40 may be identical to those shown in FIG. 1. The same is true of switch 60. Note will be taken that valve 61 in FIG. 2 may have a surrounding body 62 and an actuator 63 entirely different from that shown in FIG. 1. However, seats 64 and 65 may be very similar.

Figure 3:
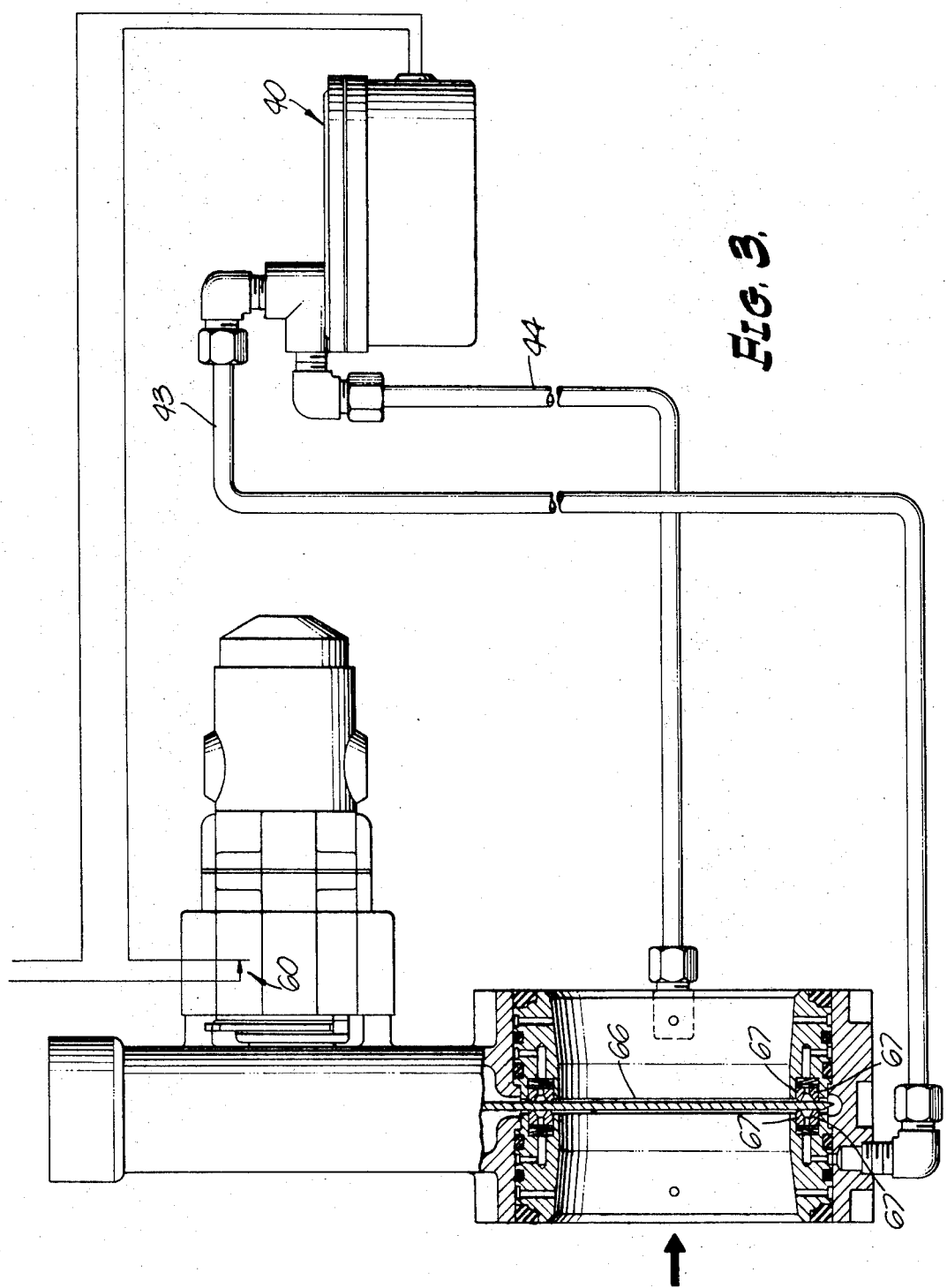

In FIG. 3, the structures connected with conduits 43 and 44 at the ends thereof adjacent body 40 may also be identical to those shown in FIG. 1. Note will be taken that the invention is applicable to gate valve 65 shown in FIG. 3. Two concentric annular valve seats 67 also are disposed on opposite sides of gate valve 66.

Figure 4:
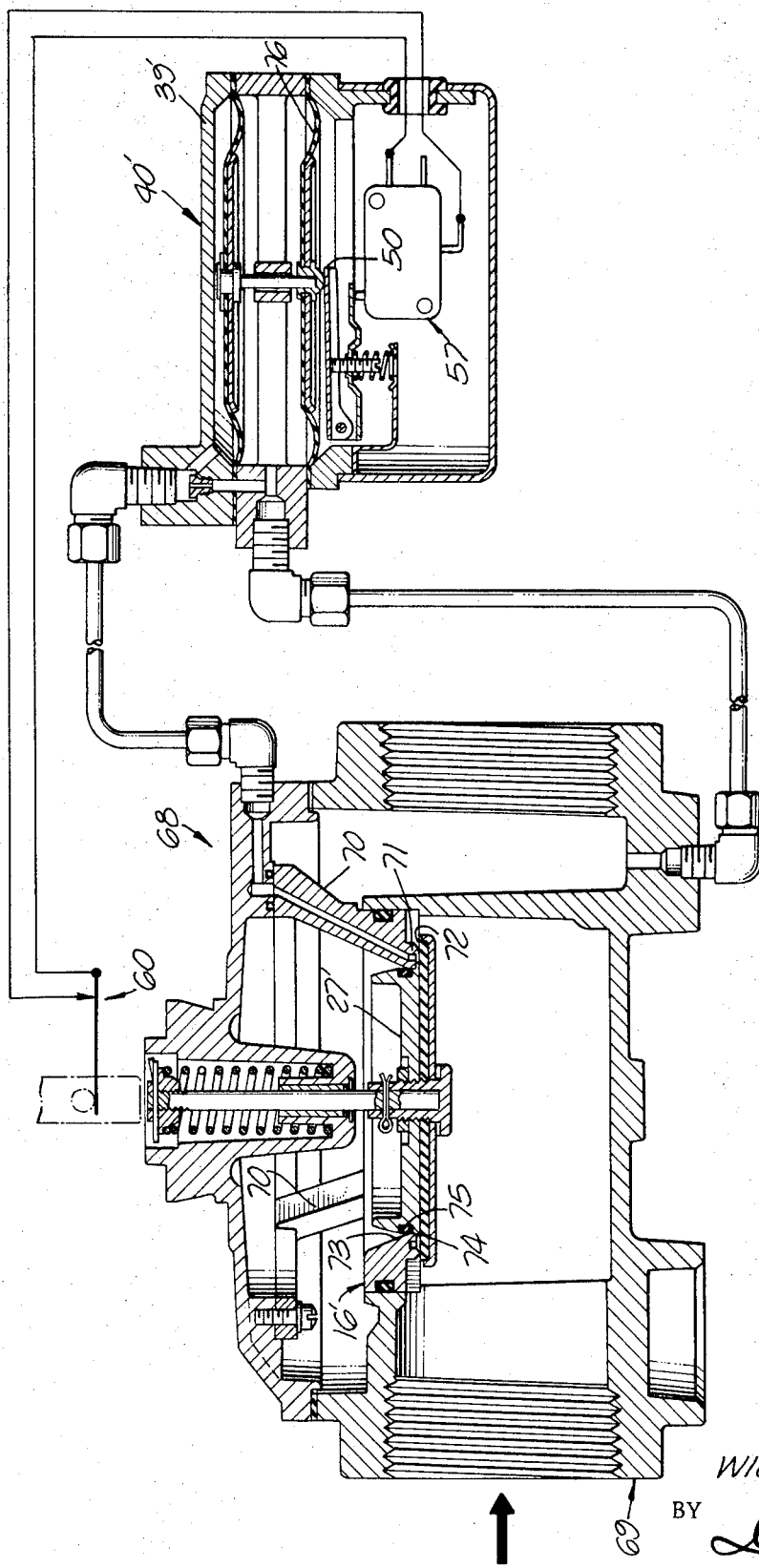

A detector 68 is shown in FIG. 4. Detector 68 has a valve body 69 which is identical to valve body 11 shown in FIG. 1. All of the structures shown in FIG. 4 are identical to those shown in FIG. 1 with the exception of a ring 16', a disc 27', and the structures shown in body 40'. Note will be taken that ring 16' is supported by projections 70 as before. However, one valve seat 71 abuts a valve 72. A second valve seat includes a cylindrical surface 73 inside ring 16'. Disc 27' has an external annular groove 74 in which an O-ring 75 is located. O-ring 75 seals against surface 73. In body 40', a diaphragm 39' is provided which serves the same purpose as diaphragm 39 shown in FIG. 1. However, an additional diaphragm 76 is disposed between diaphragm 39' and arm 50. Thus, when the pressure above diaphragm 39' is sufficient, switch 57 is opened. Further, when valve 72 is opened, adequate pressure exists between the diaphragms to open switch 57.

Figure 5:
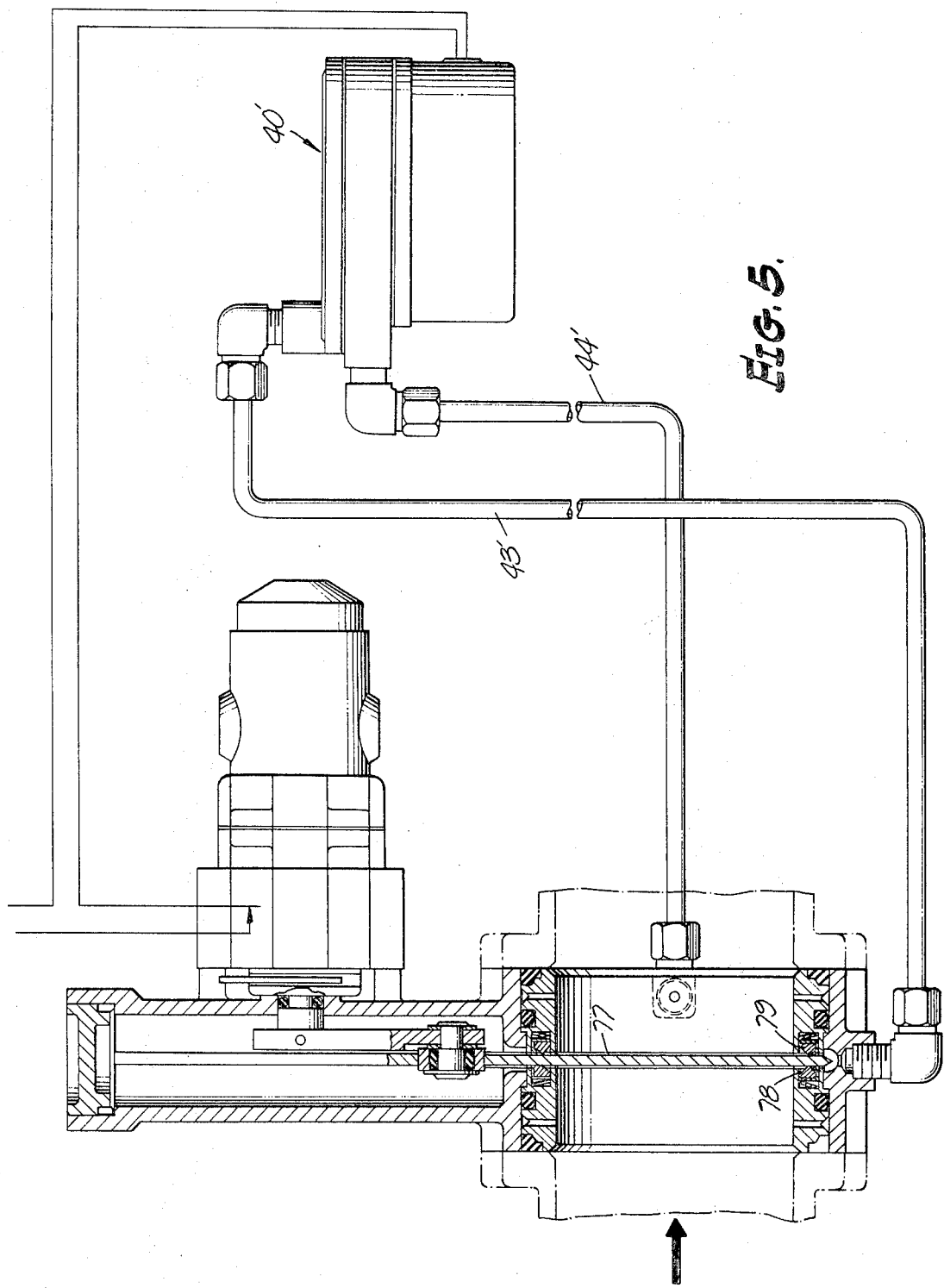

Another gate valve 77 is shown in FIG. 5. However, only the valve seats 78 and 79 are employed. Valve seats 78 and 79 are annular. Valve 77 is employed with conduits 43 and 44 and body 40'.

Figure 6:
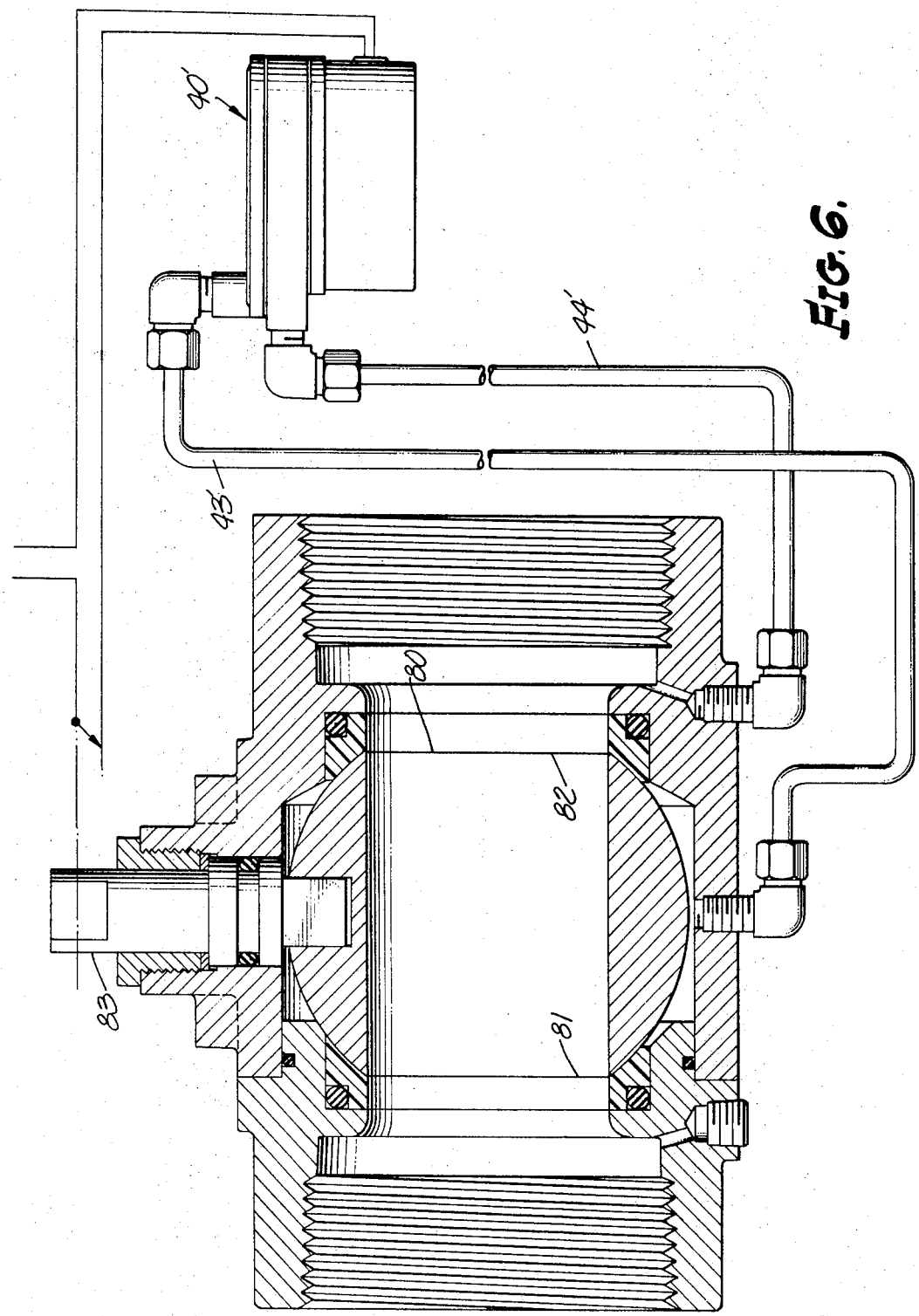

A spherical ball valve 80 is shown in FIG. 6. Valve 80 bears against valve seats 81 and 82. Valve 80 is closed by turning a shaft 83 about its axis. Conduits 43 and 44 are employed with ball valve 80 as well as body 40'.

Note will be taken that an additional or alternative pressure switch can be included in the cold check circuit. This switch would not make contact unless the inlet pressure were above a safe minimum. The switch would, thus be responsive to the inlet or upstream pressure.

Preferably, seat 25 in FIG. 1 is a few thousanths of an inch longer than seat 24. Seat 25 will, thus, contact valve 23 before seat 24 when valve 23 closes. This insures a tighter seal between valve 23 and seat 25 than between valve 23 and seat 24. Valve 23 should be sufficiently resilient that it will provide a fluidtight seal with each of the seats 24 and 25 even though the seats have different lengths.

The different lengths of the two seats 24 and 25 may be applied to all the seats disclosed herein.

The embodiment of FIG. 1 comes the closest to solving most of present day problems including:

1. Adaptability to present valves and to valves installed in the field. Thus, this feature could be added to a valve installed, for example, in the last two years at a moderate cost to the user, if deemed essential.
2. Providing a leakage detection approach which does not use up any of the available valve lift which, for example, the embodiment of FIG. 4 does. This is an important point because it:
    a. Adds the lift required for a larger and more expensive actuator.
    b. Supplies extra opening time required to get the blocker ring 75 out of the way. Thus, for example, if a 15 second total opening time were required, it would easily require 2 to 3 seconds additional before any gas flow would occur on initial opening. With the new, faster, high-speed safety valves, this delay is not desirable.

The embodiment shown in FIG. 1 will be low in cost; and it also works with a poppet-type valve, which is still one of the best automatic shutoff valves. It can get dirt under the valve, but the leak detector will pick this up. It is not subject to scratching or scoring of the seating surfaces which is typical of gate or ball valves. This sometimes can result in an undesirable lead. In addition to this, typical slide-type valves (gates or balls) often require widely varying seating forces and for final shutoff valves, may require powerful operators to offset this factor. When they are in perfect condition, they do not require a great deal more force, but when they are not in perfect condition, they require more force by integral factors, not fractions.

In accordance with the foregoing, it will be appreciated that switch 57 need not be extraordinarily sensitive. Thus, protection against the hazards of an explosion is provided inexpensively. Adequate pressure for operating switch 57 is, thus, provided by the small opening 46 in plug 45. Thus, if a leak occurs between valve 23 and seat 24, plug 45 will provide a substantial resistance to gas flow therethrough. Adequate pressure will then build against diaphragm 39 to operate switch 57 through arms 50 and 53.

I claim:

1. In fluid flow apparatus, the combination comprising: a control to admit and to shut off fluid flow, said control including a valve body having an inlet and an outlet, a valve in said body having two seats, said seats being constructed in a manner such that when said valve is closed, fluid must pass between said valve and each of said seats in succession in order to escape from said inlet into said outlet, said seats being spaced apart to provide a cavity therebetween when said valve is closed; first means providing a passage between said cavity and said outlet; second means providing a constriction in said passage, said first means including a first portion between said cavity and said constriction, said first means including a second portion between said constriction and said outlet; and third means in communication with said first portion actuable when the pressure therein exceeds a predetermined magnitude.

2. The invention as defined in claim 1, wherein said third means includes a pressure switch.

3. The invention as defined in claim 1, wherein said third means includes a housing; a diaphragm dividing said housing into inner and outer chambers, said housing having a passage in communication between said first portion and said inner chamber; a first pivoted arm positioned to be moved by said diaphragm; a second pivoted arm positioned to be moved by said first arm, a normally closed switch, said second arm being positioned to actuate said switch; and a spring to bias said second arm away from said switch.

4. The invention as defined in claim 1, wherein said valve includes a resilient disc, said seats being in the shape of concentric rings.

5. The invention as defined in claim 4, wherein said inner ring is positioned slightly closer to said disc than said outer ring.

6. The invention as defined in claim 1, wherein said valve is a gate valve, said seats being concentric rings on one side of said valve.

7. The invention as defined in claim 1, wherein said third means includes a switch, a diaphragm responsive to pressure in said first portion for actuating said switch, and a diaphragm responsive to pressure in said second portion for actuating said switch.

8. The invention as defined in claim 1, wherein said valve includes a resilient disc, said valve body including an annular partition having one annular seat for engagement with said disc, the other seat being spaced axially away from said one seat and said disc, said other seat being a cylindrical surface having an inside diameter less than that of said one seat, said valve also including a piston fixed relative to said disc to slide continuously inside said other seat, said piston having an external annular groove, and an O-ring in said groove for engagement with said other seat.

9. The invention as defined in claim 1, wherein said valve is a gate valve, one of said seats being a ring to engage one side of said valve, the other of said seats being a ring to engage the other side of said valve.

10. The invention as defined in claim 1, wherein said valve is a ball valve, one of said seats being a ring to engage one side of said valve, the other of said seats being a ring to engage the other side of said valve.